(12) United States Patent
Hung

(10) Patent No.: US 12,455,042 B2
(45) Date of Patent: Oct. 28, 2025

(54) CONNECTOR OF GREASE GUN

(71) Applicant: KING CHO MACHINERY INDUSTRIAL CO., LTD., Taichung (TW)

(72) Inventor: Fu Tien Hung, Taichung (TW)

(73) Assignee: King Cho Machinery Industrial Co., Ltd., Taichung (TW)

( * ) Notice: Subject to any disclaimer, the term of this patent is extended or adjusted under 35 U.S.C. 154(b) by 252 days.

(21) Appl. No.: 18/332,955

(22) Filed: Jun. 12, 2023

(65) Prior Publication Data

US 2024/0353058 A1 Oct. 24, 2024

(30) Foreign Application Priority Data

Apr. 18, 2023 (TW) ................. 112203592

(51) Int. Cl.
*F16N 3/12* (2006.01)
*F16N 21/02* (2006.01)

(52) U.S. Cl.
CPC ............. *F16N 3/12* (2013.01); *F16N 21/02* (2013.01)

(58) Field of Classification Search
CPC .................................. F16N 3/12; F16N 21/02
USPC ............................................. 184/105.2, 105.3
See application file for complete search history.

(56) References Cited

U.S. PATENT DOCUMENTS

| | | | | |
|---|---|---|---|---|
| 2,280,533 A * | 4/1942 | Norman | ................. | F16N 21/02 184/105.3 |
| 3,955,648 A * | 5/1976 | Walker, Jr. | ............. | B60R 17/00 184/105.3 |
| 4,347,915 A * | 9/1982 | Cooper | ................... | F16N 21/02 184/105.3 |
| 4,664,298 A * | 5/1987 | Shew | ........................ | F16N 3/12 222/409 |
| 6,467,579 B1 * | 10/2002 | Simon | ....................... | F16N 3/12 222/327 |
| 7,267,198 B2 * | 9/2007 | Cen | ........................... | F16N 3/12 222/256 |
| 8,205,639 B2 * | 6/2012 | Kim | ........................... | F16K 1/12 184/105.3 |
| 9,010,364 B2 * | 4/2015 | Tokach | ................... | F16K 24/00 137/880 |
| 2005/0258005 A1 * | 11/2005 | Chen | ....................... | F16N 11/08 184/105.1 |
| 2013/0061967 A1 * | 3/2013 | Klaphake | ................ | F16N 25/02 137/861 |

* cited by examiner

*Primary Examiner* — Anna M Momper
*Assistant Examiner* — Mark K Buse
(74) *Attorney, Agent, or Firm* — Rosenberg, Klein & Lee

(57) ABSTRACT

A greases gun includes a body having a barrel in which grease is stored. The barrel has a mount mounted to the top thereof, and a hose is connected to the mount and has a nozzle connected thereto. A lever is pivotably connected to the barrel to pump the degrease out from the nozzle. A connector is connected to the mount and includes a tubular part. A passage is defined through the tubular part. A ball is movably located in the passage and movable between a stop piece located in the passage and a protrusion protruding inward from the passage. A connection portion is formed to the top of the tubular part of the connector. The nozzle is removably connected to the connection portion. The connector provides functions of grease refill and gas release, and also prevents from grease leakage.

7 Claims, 9 Drawing Sheets

CONNECTOR OF GREASE GUN

FIELD OF THE INVENTION

The present invention relates to a grease gun, and more particularly, to a connector of a grease gun that keep environment clean.

BACKGROUND OF THE INVENTION

A conventional grease gun 9 known to applicant is disclosed in FIG. 9 and is used for lubricating mechanical equipment by adding lubricating grease. The grease gun 9 is disclosed in the CN206592739U "rod-type grease gun," consists of a gun body 90, an air release device 91, an oil injection device 92, a passage 93, and a lever 94. When refilling with new grease, the grease gun 9 can inject the new grease through the oil injection device 92. When replacing the grease can or container, the lever 94 of the grease gun 9 is pressed to release the gas inside the gun body 90 through the air release device 91.

However, the grease gun 9 mentioned above requires the use of both the air release device 91 for gas release and the oil injection device 92 for grease injection, making the structure of the grease gun 9 complex. This complexity leads to increased manufacturing costs, necessitating the need for improvement.

The present invention intends to provide a connector for a grease gun to eliminate the shortcomings of the conventional grease guns.

SUMMARY OF THE INVENTION

The present invention relates to a greases gun and comprises a body having a barrel for grease storage. The barrel includes a mount mounted to the top thereof, and a hose is connected to the mount and has a nozzle connected thereto. A lever is pivotably connected to the barrel to pump the grease out from the nozzle. A connector is connected to the mount and includes a tubular part, and a passage is defined through the tubular part. A ball is movably located in the passage. A stop piece is located in the passage to restrict the ball from dropping into the barrel. A connection portion is formed to the top of the tubular part of the connector. The nozzle is removably connected to the connection portion.

The advantages of the present invention are that the nozzle is positioned by the connector. The connector releases gas when replacing the barrel. The connector is compact and involves multiple functions to one compact part.

After lubrication, the nozzle can be connected to the connection portion of the connector to avoid splash from the nozzle to keep the environment clean.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
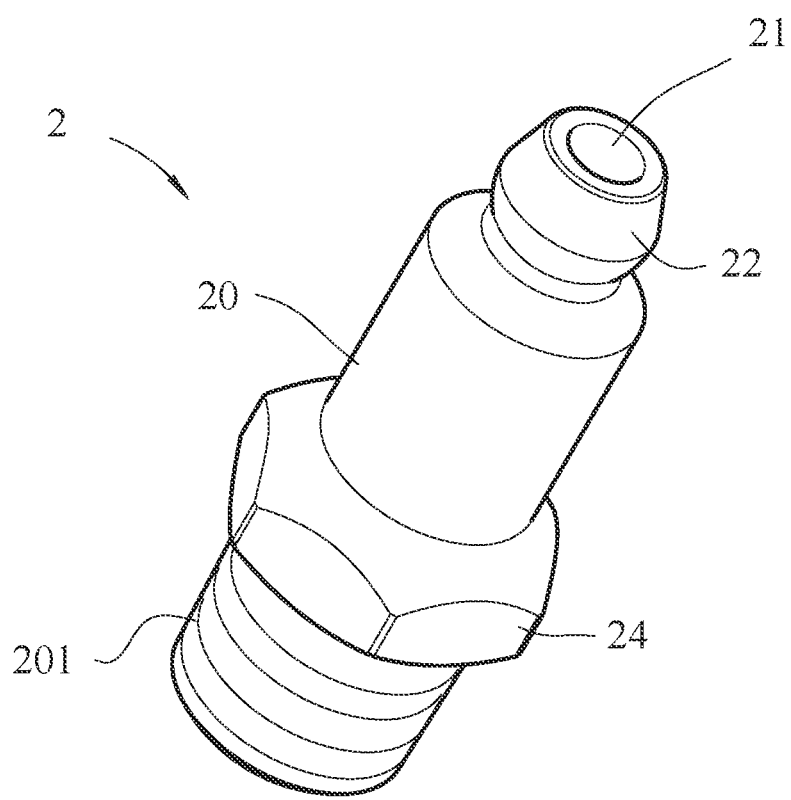
FIG. 1 is a perspective view to show the connector of the present invention.
Figure 2:
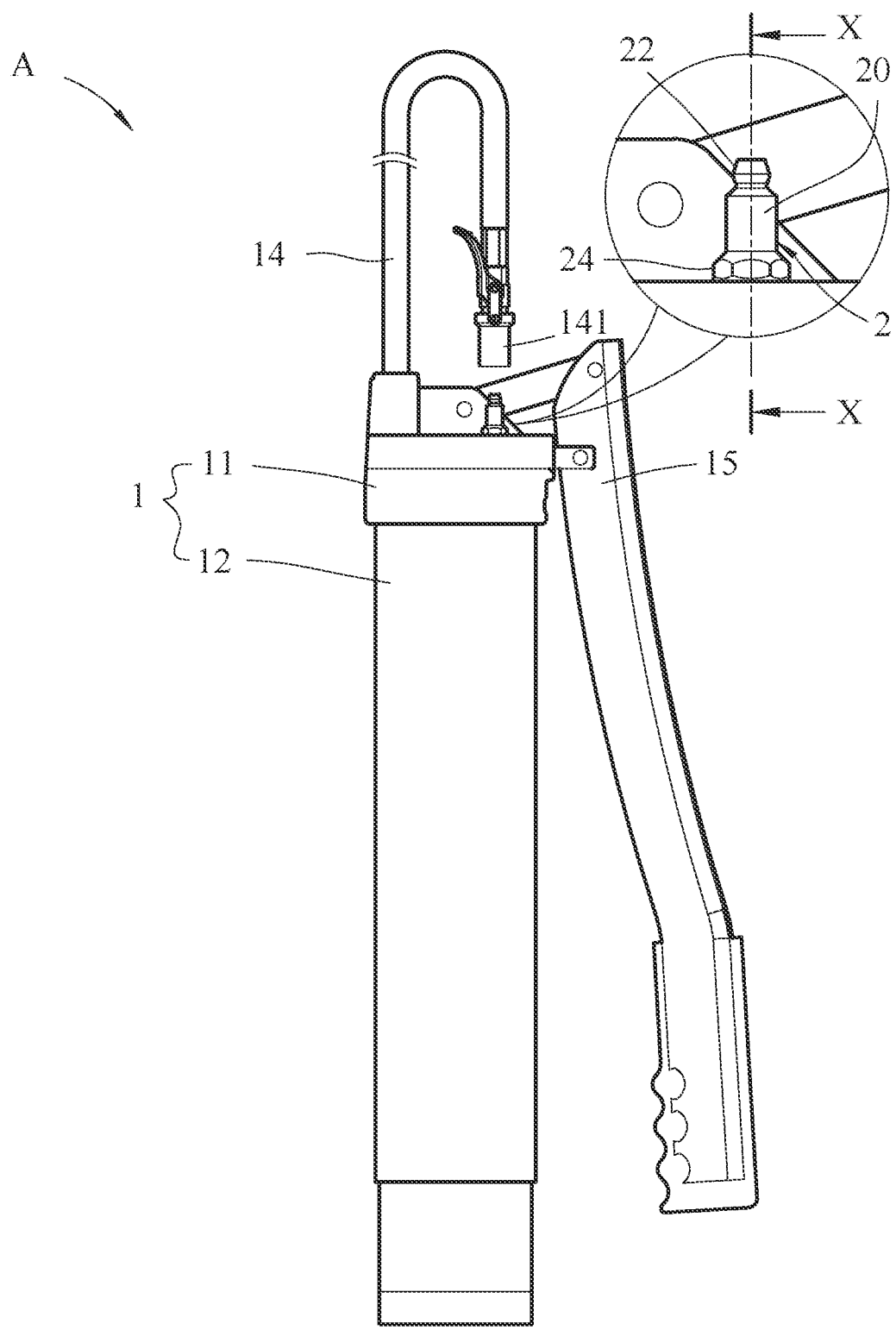
FIG. 2 illustrates the connector of the present invention is installed to a grease gun.

Referring to FIGS. 1 and 2, the grease gun "A" of the present invention comprises a body 1 having a barrel 12 for grease storage. A mount 11 is mounted to the top of the barrel 12, and a hose 14 is connected to the mount 11 and has a nozzle 141 connected thereto. A lever 15 is pivotably connected to the barrel 12. By pivoting the lever 15, the grease is pumped out from the nozzle 141. The mount 11 includes a threaded hole 13 as shown in FIG. 3 to be connected to the connector 20 which will be described below.

Figure 3:
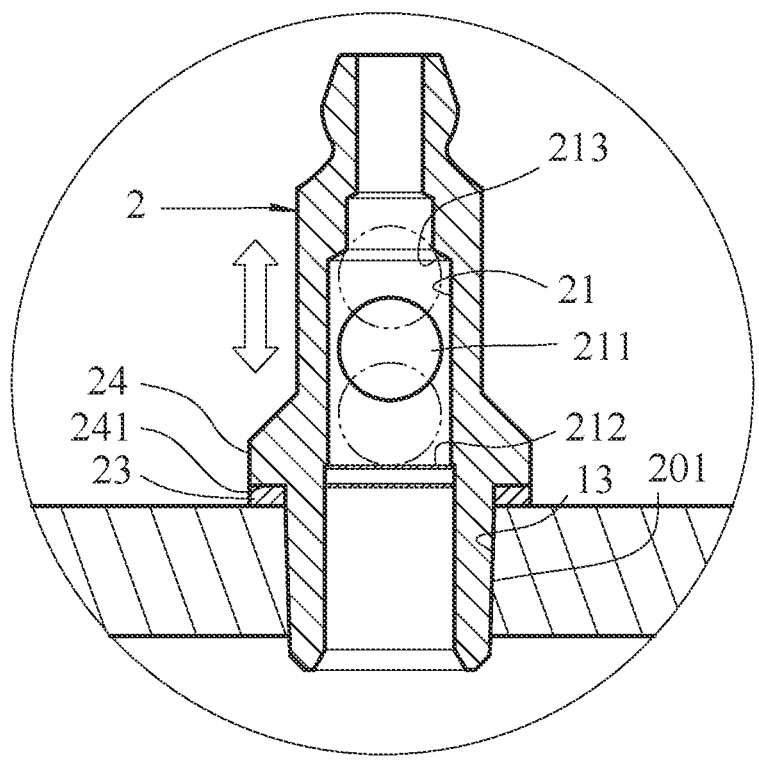
FIG. 3 is a cross sectional view, taken along line X-X in FIG. 2.
Figure 4:
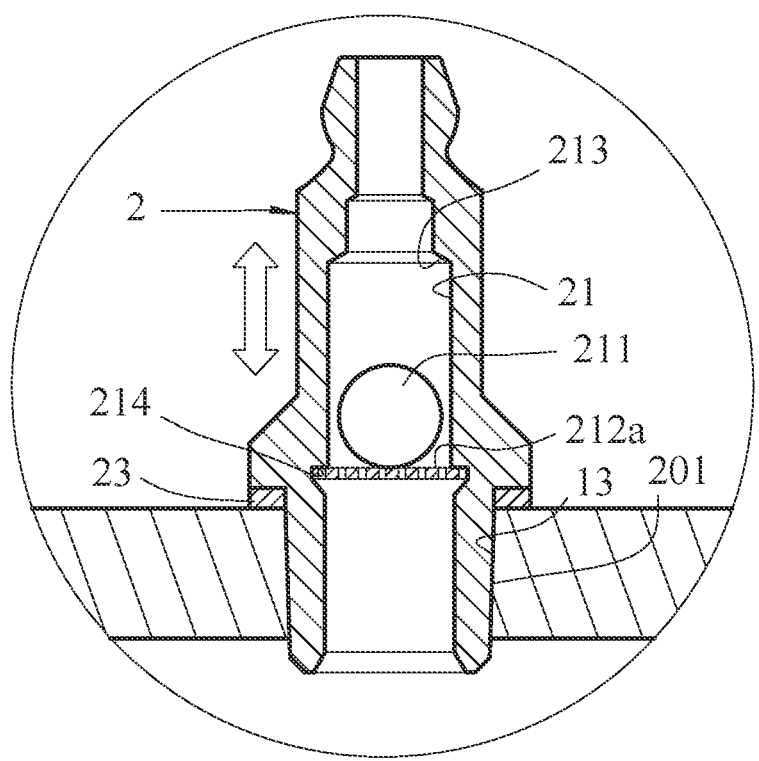
FIG. 4 illustrates the ball is movable in the passage.

As shown in FIGS. 3 and 4, the connector 2 includes a tubular part 20, and a passage 21 is defined through the tubular part 20. A ball 211 is movably located in the passage 21. A stop piece 212 is located in the passage 21 to restrict the ball 211 from dropping into the barrel 12. A protrusion 213 protrudes radially and inward from the inner periphery of the passage 21 so as to form a narrowed path surrounded by the protrusion 213. The ball 211 is movable between the protrusion 213 and the stop piece 212. The stop piece 212 can be a pin or a netted part 212a. The netted element 212a can be designed as a semi-rigid plate with multiple resilient and corrosion-resistant metal materials, industrial rubber, or composite carbon fiber. It is securely placed in a groove 214 set in the passage 21 to achieve the purpose of limiting the displacement of the ball 211. A connection portion 22 is formed to the top of the tubular part 20 of the connector 2, and the nozzle 141 is removably connected to the connection portion 22. The connection portion 22 of the tubular part 20 of the connector 2 is a tapered part. The tubular part 20 includes a hexagonal section 24 protrusion from the outer periphery thereof. The hexagonal section 24 includes a shoulder 241 formed to the underside thereof, and an O-ring 23 is located between the shoulder 241 and the mount 11. The tubular part 20 of the connector 2 includes outer threads 201 which are connected to the threaded hole 13.

Figure 5:
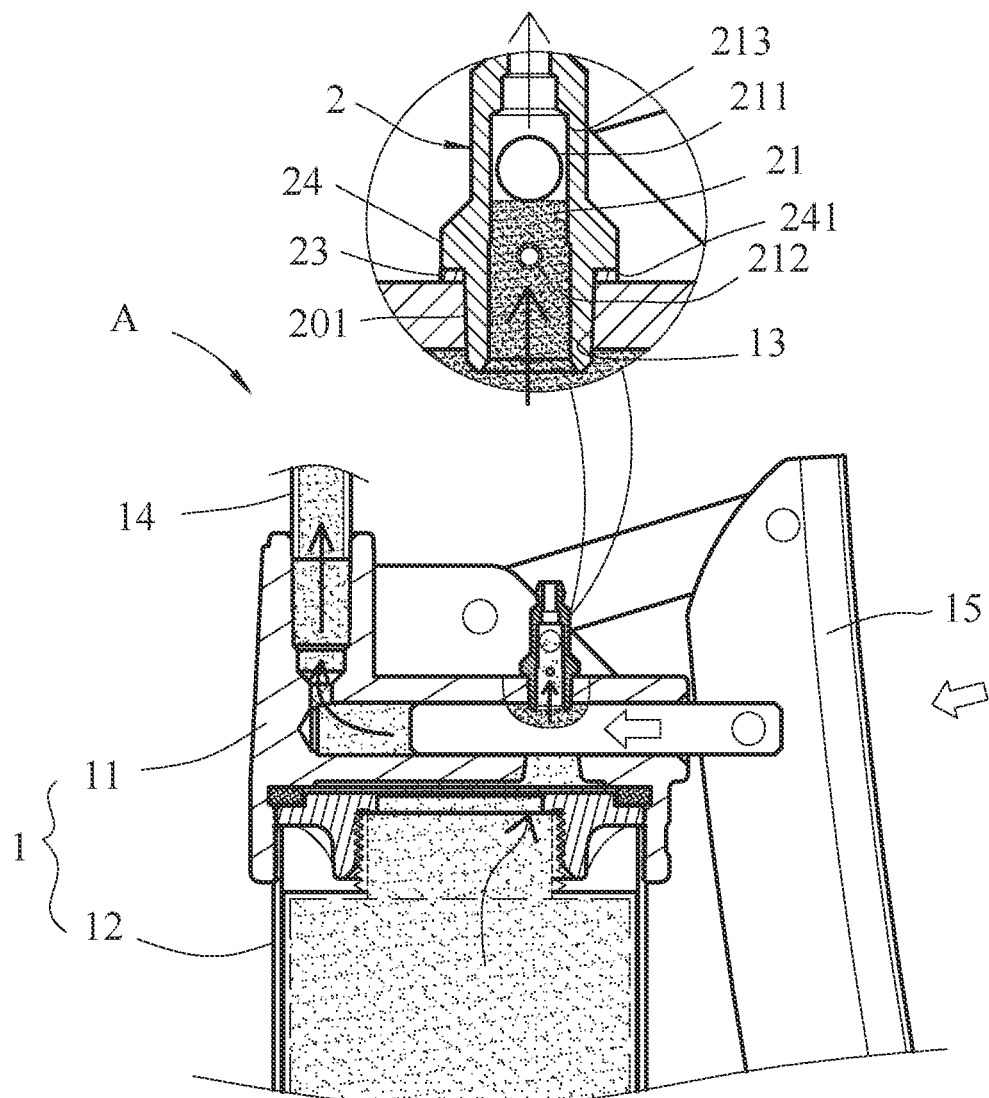
FIG. 5 illustrates that gas is released from the connector.
Figure 6:
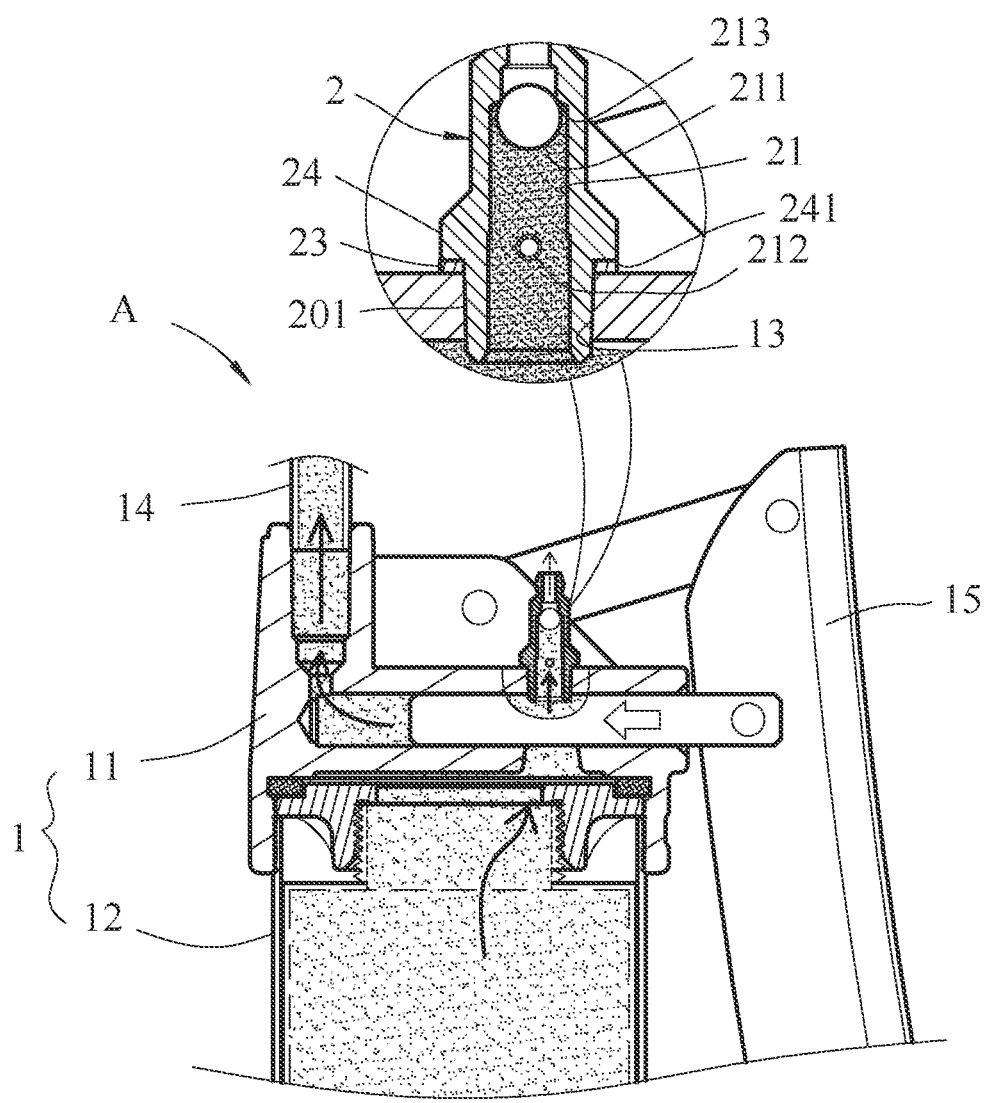
FIG. 6 illustrates that the ball seals the passage by abutting the protrusion in the passage.

As shown in FIGS. 5 and 6, when the grease gun "A" needs to replace a new barrel 12, by operating the lever 15, the pressurized air moves toward the connector 2 and the hose 14. The gas in the barrel 12 is released from the passage 21. After the gas in the barrel 12 is completely released, the grease in the barrel 12 pushes the ball 21 to contact the protrusion 213 to seal the passage 21 so as to prevent the degrease from leaking.

Figure 7:
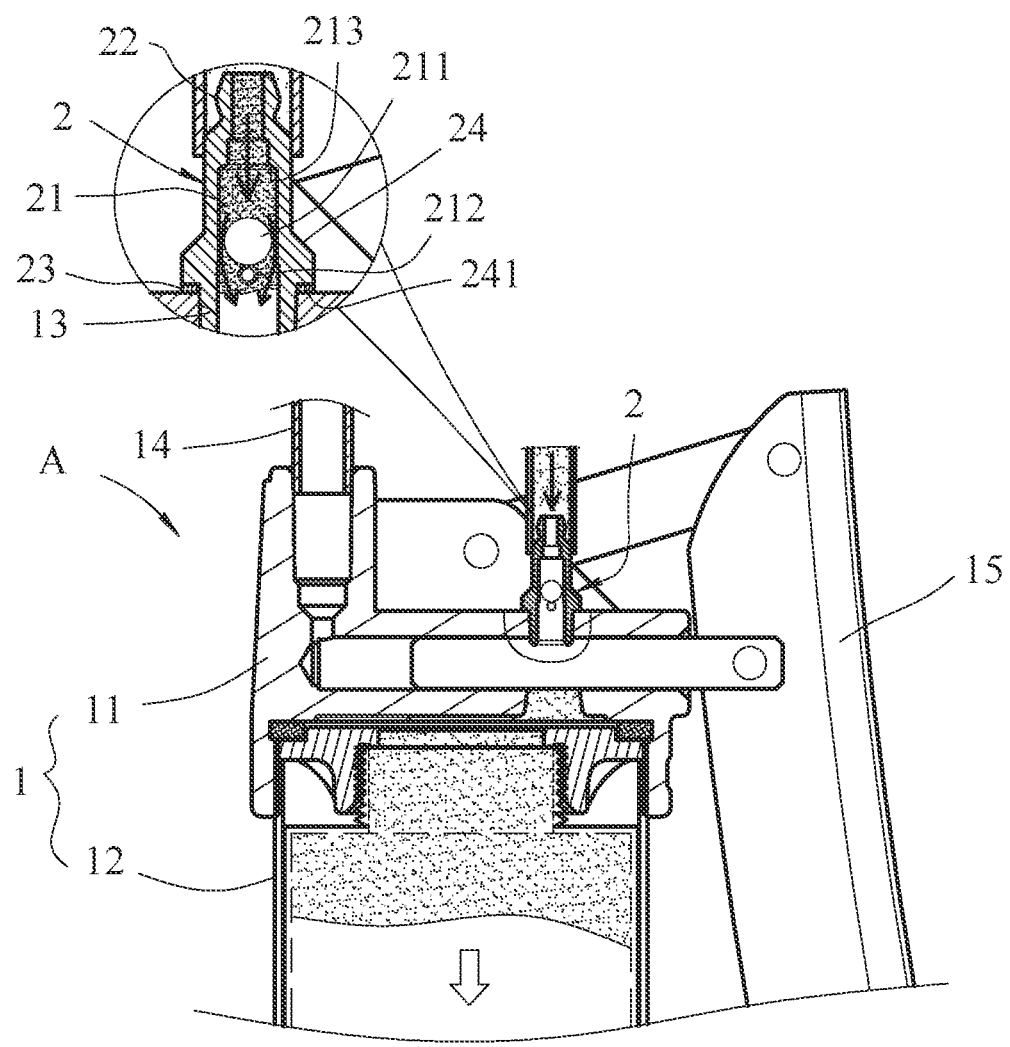
FIG. 7 illustrates that grease is refilled into the grease gun via the connector.

As shown in FIG. 7, when refilling grease to the grease gun "A", the grease is refilled via the connector 2. The ball 211 is pushed downward by the degrease, and the ball 211 is stopped by the stop piece 212. The grease is able to flow into the barrel 12 via the holes of the stop piece 212, while the mount 11 and the barrel 12 do not need to be opened or removed to avoid air from entering into the grease gun "A". During the refill, the lever 15 does not need to operate to release the gas.

Figure 8:
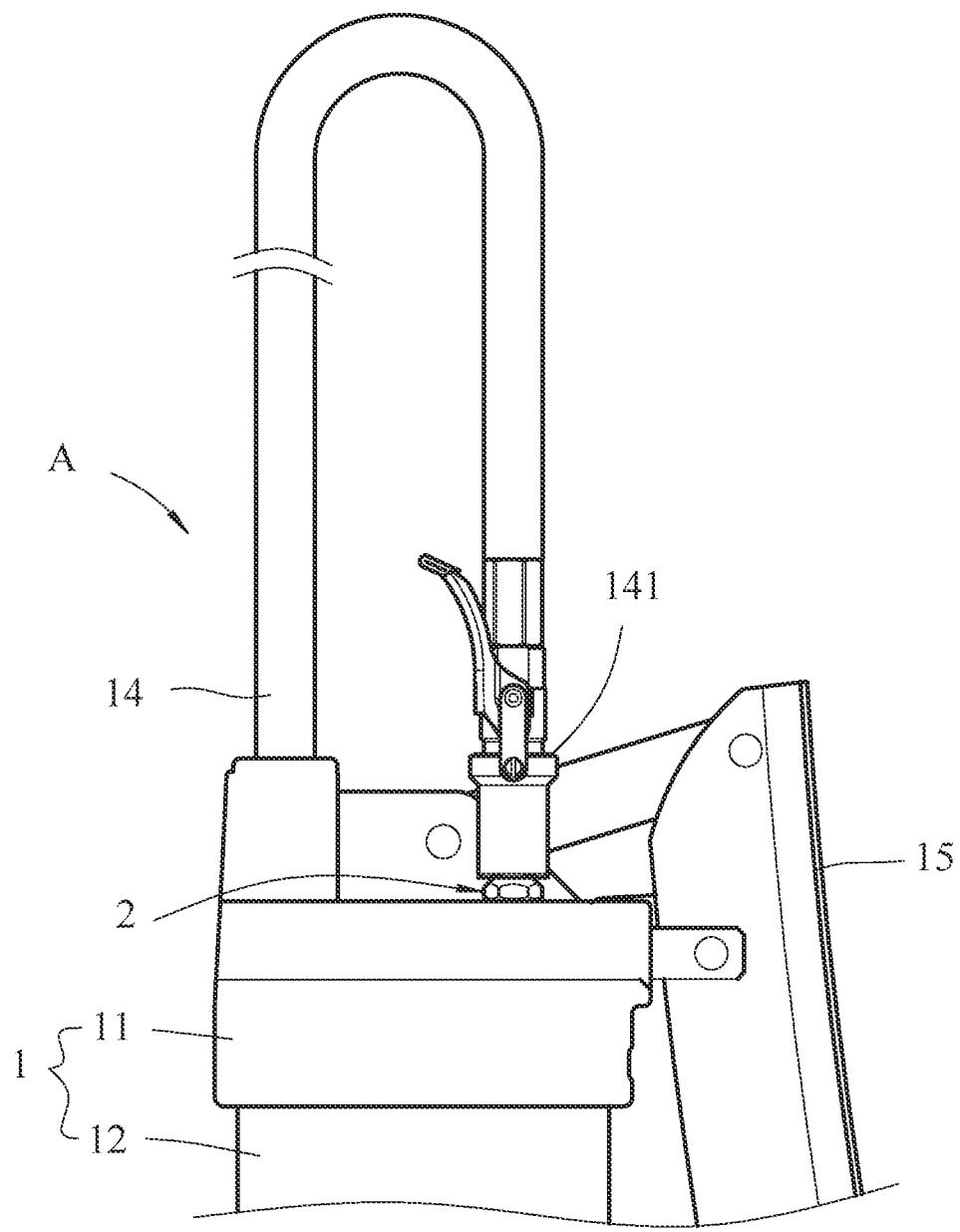
FIG. 8 illustrates that the nozzle is connected to the connector.
Figure 9:
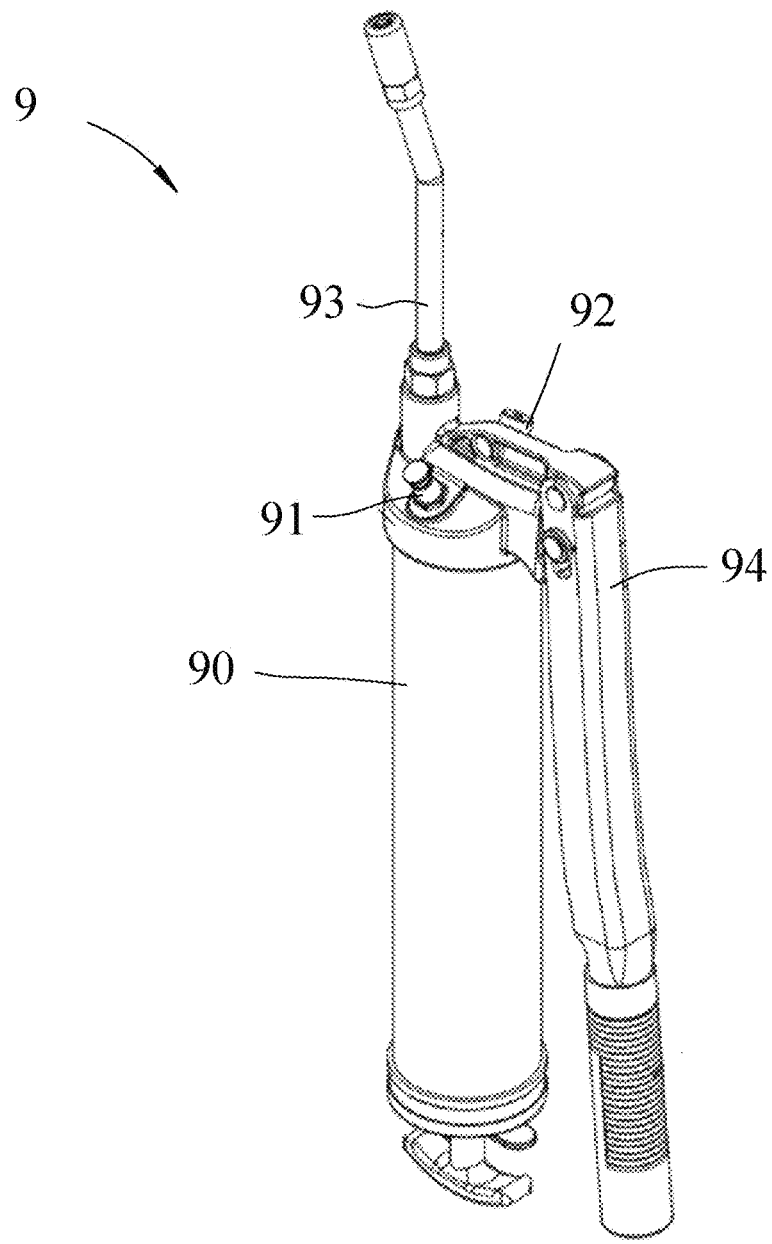
FIG. 9 illustrates a conventional grease gun.

As shown in FIG. 8, the hose 14 is soft and flexible, and can be pressed or damaged to cause leaking, the nozzle 141 of the present invention can be connected to the connection portion 22 of the connector 2 to eliminate the problem of leakage due to pressing or damage to the hose 14.

While we have shown and described the embodiment in accordance with the present invention, it should be clear to those skilled in the art that further embodiments may be made without departing from the scope of the present invention.

What is claimed is:

1. A grease gun, comprising:
    a body including a barrel and a mount, the barrel being configured for grease storage and the mount being mounted to one of two opposing longitudinal ends of the barrel;
    a hose connected to the mount and a nozzle extending from one of two opposing ends of the hose;
    a lever pivotably connected to the barrel; and
    a connector connected to the mount and including a tubular part and a connection portion, wherein a diameter of the connection portion is lesser than a diameter of the tubular part, wherein a passage is formed through an inner section of the tubular part and a ball is movably located within the passage, and a stop piece is formed in the passage at a portion of the tubular part adjacently located to the mount for restricting the ball from dropping into the barrel whereby the ball directly and physically contacts the stop piece, wherein the stop piece is configured to allow fluid to pass between the passage and the barrel, the connection portion being formed at an end of the tubular part of the connector extending away from the mount, and the connection portion being formed with an inner channel fluidly coupled to the passage of the tubular part whereby pressurized air contained within the barrel is dischargeable external to the body and the connector via the passage and the inner channel and grease is insertable externally from the body and the connector into the barrel via the inner channel and the passage, and wherein the nozzle is removably connectable to the connection portion.

2. The grease gun as claimed in claim 1, wherein a protrusion protrudes radially and in an inward direction from an inner periphery of a portion of the tubular part adjacently located to the connection portion, thereby the ball is movable between the protrusion and the stop piece, and wherein the connection portion is disposed above the protrusion.

3. The grease gun as claimed in claim 1, wherein the stop piece is either one of a pin or a netted part.

4. The grease gun as claimed in claim 1, wherein a hexagonal section protrudes from an outer periphery of the portion of the tubular part adjacently located to the mount.

5. The grease gun as claimed in claim 4, wherein a shoulder is formed at an underside, of the hexagonal section and an O-ring is positioned between the shoulder and the mount.

6. The grease gun as claimed in claim 1, wherein the connection portion of the connector is tapered.

7. The grease gun as claimed in claim 1, wherein the mount is formed with a threaded hole and an outer periphery of the tubular part of the connector located between the hexagonal section and a corresponding longitudinal end of the tubular part is formed with outer threads for being threadedly engaged with the threaded hole.

* * * * *